June 10, 1924.
W. LA HODNY
1,497,217
MOUNTING FOR WINDSHIELD WINGS
Filed Sept. 2, 1922
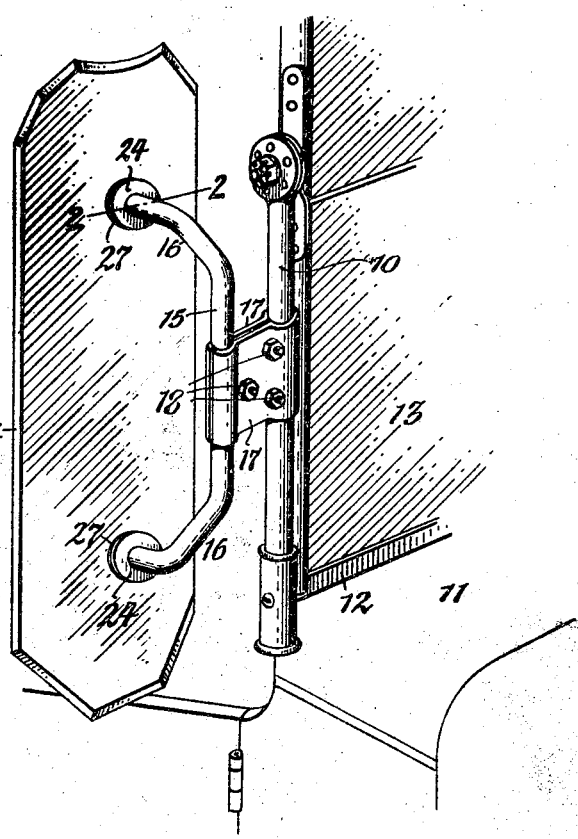
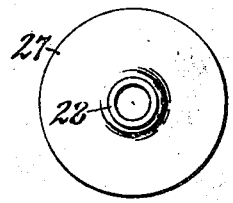
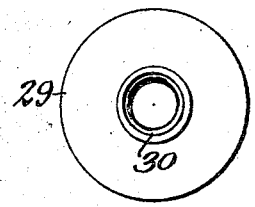
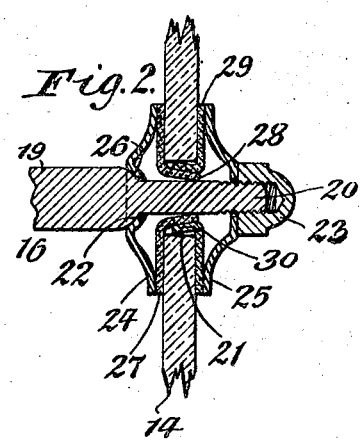
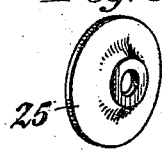
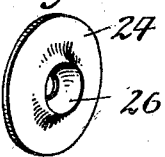
Inventor
William La Hodny
by Geyer & Popp
Attorneys Patented June 10, 1924.

1,497,217

UNITED STATES PATENT OFFICE.

WILLIAM LA HODNY, OF BUFFALO, NEW YORK.

MOUNTING FOR WINDSHIELD WINGS.

Application filed September 2, 1922. Serial No. 585,988.

*To all whom it may concern:*

Be it known that I, WILLIAM LA HODNY, a citizen of the United States, residing in Buffalo, in the county of Erie and State of New York, have invented new and useful Improvements in Mountings for Windshield Wings, of which the following is a specification.

This invention relates to a mounting for glass wings on opposite vertical edges of wind shields and more particularly to wings of this character which are provided with holes or openings for the passage of some of the holding members.

It is the object of this invention to provide a mounting of this type which is so constructed that the pressure upon clamping a wing in place will be exerted squarely against the flat surfaces of the wing to avoid cracking or breaking the same and also to avoid bringing any hard metal in contact with the wing which otherwise would be liable to ship or crack the same.

In the accompanying drawings: Figure 1 is a perspective view of a wing applied to a windshield by my improved mounting. Figure 2 is a section of the same, on an enlarged scale, taken on line 2—2, Fig. 1. Figures 3, 4, 5 and 6 are perspective views of different members of the mounting.

Similar characters of reference refer to like parts throughout the several views.

My invention is applicable to wind shields of various forms, that for example shown in the drawings, comprising an upright post or standard 10 rising from the cowl 11 of the automobile and supporting one edge of the frame 12 which carries the glass 13 of the wind shield. The wings 14 which are mounted adjacent to the opposite vertical edge of the wind shield consist of a glass plate having opposite flat sides and an edge which may be of any desired contour.

The means embodying my invention for mounting this wing on the upright supporting post 10 of the windshield are constructed as follows:

Arranged on one side of the wing is a bracket which consists generally of an upright bar 15 which has its upper and lower ends bent toward one side in the same direction to form two substantially parallel arms 16 which carry the wing. The central part of the bracket bar is secured to the wind shield post in such manner that this bracket can be turned horizontally for bringing the wing into different angular positions relative to the wind shield. This is accomplished in the present case by means of two coupling plates 17 having jaws at their opposite ends which are held in frictional engagement with opposite sides of said post and bar by means of bolts 18 connecting the central parts of these plates.

Each arm of the bracket has an enlarged body 19 and a reduced shank 20 extending from the body through an opening 21 in the glass wing. A shoulder 22 is formed on the arm between its body and shank which in the preferred construction is of rounded or spherical form. The outer or front end of the shank is provided with an external screw thread which receives a screw nut 23. On opposite sides of the glass wing are arranged two clamping disks 24, 25 each of which is constructed of sheet metal in the form of a dish or cup and provided with a central opening whereby the same may be applied to the shank of the respective bracket arm. The clamping disk 24 is interposed between the shoulder of the supporting arm and the adjacent flat side of the wing and has its marginal part facing the wing while its central part is constructed to form a spherical concave seat 26 which receives the spherical shoulder of the supporting arm and forms a ball and socket joint therewith. The other clamping disk 25 has its marginal part facing the other side of the wing and the convex side of its central part engaging with the screw nut on the shank.

By means of the ball and socket joint between the disk 24 and the supporting arm this disk can swivel on this arm and adapt itself squarely to the flat side of the wing opposite to that which is engaged by the disk 25 so that both of these disks bear evenly on the wing and obtain a firm hold thereon regardless of whether the sides of the wing are parallel, thus compensating for glass wings which may be constructed of glass plates, the opposite sides of which are not parallel.

The supporting arm, screw nut and clamping disk are preferably made of comparatively hard metal, such as steel or brass for the sake of rigidity, but if the same were permitted to come in contact with the glass wing the latter would be liable to be broken, cracked or chipped. To avoid this cushioning means are interposed between the shank and clamping disks and the wings which in their preferred form consist of two cushion washers one of which has a flange 27 arranged between the margin of the disk 24 and the adjacent side of the wing and provided with a tubular neck 28 which surrounds the shank and enters the adjacent opening in the wing and the other washer has a flange 29 arranged between the margin of the disk 25 and the other side of the wing and a tubular neck 30 which surrounds the shank and projects into the opening in the wing. The necks of the two cushion washers are preferably made of male and female conical form so that one can telescope into the other, for which purpose the neck of the disk 24 tapers away from its flange and the neck of the disk 25 flares away from its flange, as shown in Fig. 2. The two cushion washers are made of soft metal, such as German silver, copper or an alloy of the same.

By this means non-rigid members are interposed between the shank and the bore of the opening in the wing and between the clamping disks and the sides of the wing which cushions the pressure of the bracket against the wing in all directions and prevents strains on the same, thereby preventing breaking or injuring of the wing when assembling the parts or when subjected to the vibrations of the car.

By providing the cushion washers with tubular necks which telescope into one another the distance between the flanges of these washers may vary according to the thickness of the glass of which the wings are made and still maintain a protecting cushion between the bore of the wing opening and the periphery of the supporting arm.

I claim as my invention:

1. A mounting for windshield wings comprising an arm having an enlarged body, a reduced shank, and a spherical shoulder between the enlarged body and the reduced shank, said shank being adapted to pass through an opening in the wing and provided at its outer end with an external screw thread, a screw nut arranged on the threaded end of said shank, a clamping disk arranged on said shank and interposed between said nut and one side of said wing, and a clamping disk arranged on said shank and provided on its central part with a spherical seat which receives said spherical shoulder while its marginal part engages with the opposite side of said wing.

2. A mounting for wind shield wings, comprising an arm adapted to pass through an opening in the wing and provided on one side of the same with a shoulder and on the opposite side of the same with a screw nut, cushion washers having flanges engaging with opposite sides of said wing and tubular necks which telescope one into another within the opening of said wing, and clamping disks interposed between the outer sides of the flanges of said washers and the shoulder and nut of said arm, respectively.

3. A mounting for wind shield wings, comprising an arm adapted to pass through an opening in the wing and provided on one side of the same with a shoulder and on the opposite side of the same with a screw nut, cushion washers having flanges engaging with opposite sides of said wing and tubular necks which telescope one into another within the opening of said wing, and clamping disks interposed between the outer sides of the flanges of said washers and the shoulder and nut of said arm, respectively, said necks being of conical form and one of them being tapered from its flange toward its outer end and the other being flared from its flange toward its outer end.

WILLIAM LA HODNY.